Mar. 6, 1923.

J. P. CROWLEY ET AL.
APPARATUS FOR BENDING CONTINUOUS SHEET GLASS.
FILED DEC. 15, 1920.

1,447,647.

INVENTORS
JOSEPH P. CROWLEY
CLIFFORD A. ROWLEY
By C.A.Rowley
ATTORNEY.

Patented Mar. 6, 1923.

1,447,647

UNITED STATES PATENT OFFICE.

JOSEPH P. CROWLEY AND CLIFFORD A. ROWLEY, OF TOLEDO, OHIO, ASSIGNORS TO THE LIBBEY-OWENS SHEET GLASS COMPANY, OF TOLEDO, OHIO, A CORPORATION OF OHIO.

APPARATUS FOR BENDING CONTINUOUS-SHEET GLASS.

Application filed December 15, 1920. Serial No. 430,880.

*To all whom it may concern:*

Be it known that we, JOSEPH P. CROWLEY, and CLIFFORD A. ROWLEY, citizens of the United States, residing at Toledo, in the county of Lucas and State of Ohio, have invented new and useful Improvements in Apparatus for Bending Continuous-Sheet Glass, of which the following is a specification.

This invention relates to an apparatus for bending or deflecting the course of a continuous sheet of glass without injuring the finely fire-polished surface of the sheet.

In the art of drawing or flowing glass into sheet form, the original fire polished surface of the sheet, is very easily marred or scratched whenever contacted by any hard object or mechanism, especialy while the sheet is still in a highly heated and semi-plastic condition. In some systems of producing sheet glass, for example the system set forth in the patent to Colburn 1,248,809, granted Dec. 4, 1917, it is found desirable to bend the sheet, while still soft and workable, from a vertical into a horizontal plane. This has been successfully accomplished by passing the sheet partially around a cooled bending roller of some hard and heat-resisting metal, having a finely polished surface. However, as soon as the surface of the hard metal roller becomes worn, scratched or marred, the impressions of these imperfections are carried into the glass sheet passing thereover and reduce the quality of the article produced. Many different metals have been tried but none of them retain their highly polished surface for any great length of time, and it is frequently necessary to remove the rollers and clean and regrind the surface. It is well known that there are many soft metals, and other materials, that will not mar the surface of the glass, but these materials will not withstand the intense heat in which the bending process is carried out. It is the object of the present invention to provide a hard metal bending roller carrying a continuously renewed surface or film of softer metal or its equivalent, over which the glass sheet is passed and bent without injury to its surface Other objects and advantages of the invention will become apparent as the detailed description proceeds.

Figure 1:
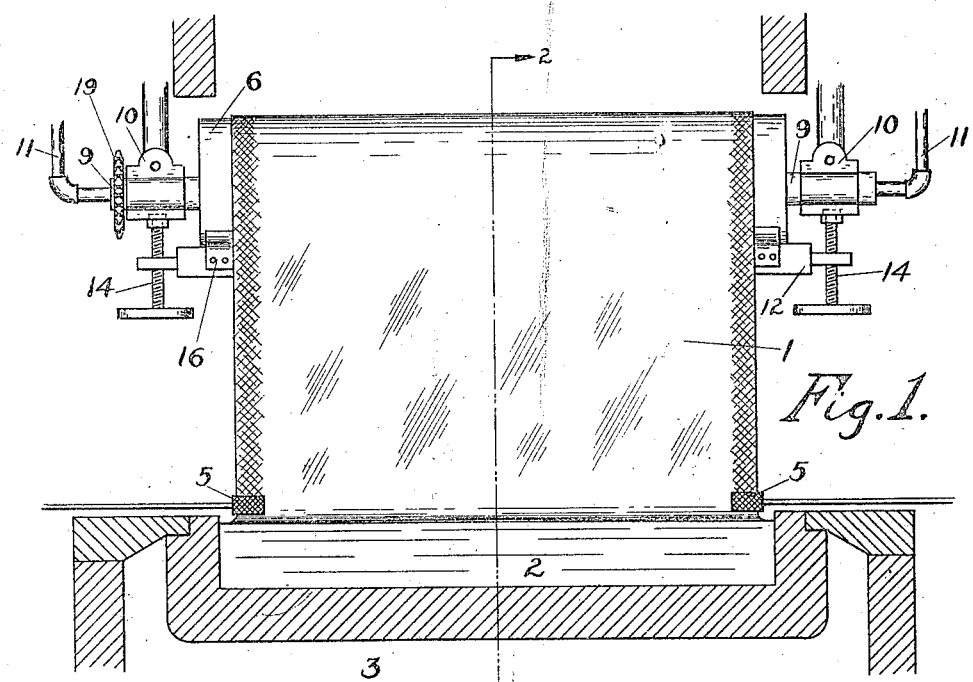
Fig. 1 is a vertical transverse section through the sheet drawing apparatus, taken substantially on the line 1—1 of Fig. 2, the vertical run of the sheet and the bending mechanism being shown in elevation.
Figure 2:
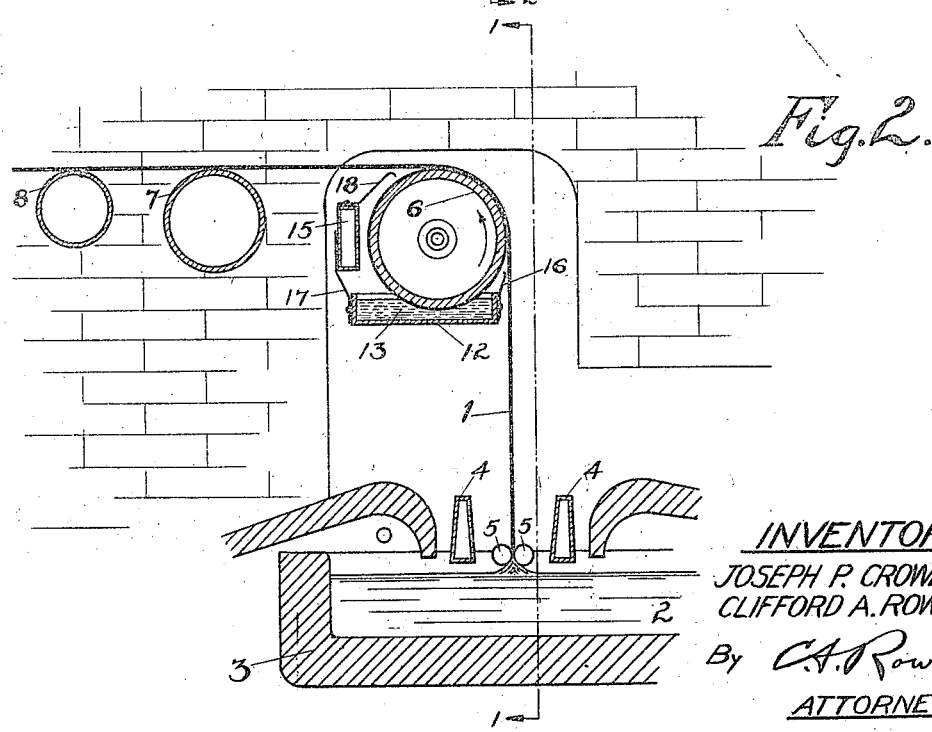
Fig. 2 is a vertical longitudinal section through the sheet and bending mechanism, taken substantially on the line 2—2 of Fig. 1.

The glass sheet 1, is drawn upwardly from the bath of molten glass 2, in the receptacle 3, passing between coolers 4, and edge-forming rollers 5, all as is old in the art, and more particularly set forth in the patent to Colburn, noted above. The formed sheet is then bent laterally over the roller 6, and passes off horizontally over intermediate supporting rollers 7 and 8, and through any suitable form of drawing mechanism (not shown), by which the necessary draft is furnished to continuously produce the sheet. If the height of the bending roller 6 above the drawing point of the sheet is not excessive, the sheet will remain in a sufficiently plastic condition to make the bend without reheating. If the roller 6 be located at a greater height it may be necessary to reheat the sheet. These heating devices, as well as numerous others which are used to properly maintain and distribute the temperature throughout the drawing chamber have not been illustrated, since they will vary with the character of the sheet producing apparatus, for use with which this bending device may be adapted.

The bending roller 6 may be made of iron or steel or other metal having the necessary strength and heat-resisting qualities, and has at each end a shaft extension 9, journaled in suitable supporting brackets 10. The roller 6 is cooled internally by air or water, or a combination of the two, the fluid being conducted into the ends of the cylinder through the pipe connections 11, and if water is used, suitable drains (not shown) are provided for the liquid to pass out.

The outer cylindrical surface of the roller 6, is heavily coated with a layer of a soft metal such as tin or lead. This well known process, usually referred to as "tinning," is the same as employed in producing the common tin-plate. The iron or other metal to be tinned is first treated with a suitable acid, and is then dipped into a bath of the molten tin or lead. The dipping is repeated until the desired coating is obtained. This layer of tin adheres integrally to the base metal, as in the common process of soft-soldering, and does not readily burn off, even though subjected to a temperatures sufficient to melt the softer surface metal.

However, continual subjection to an intense heat will eventually melt away the layer of tin, and means are provided to constantly maintain and replenish this coating. Adjustably mounted below the bending roller 6 is a pan or receptacle 12, containing a bath of molten tin or lead or similar material 13. As illustrated, this receptacle is carried at its ends by adjusting screws 14, rotatably suspended from the bearings 10, but this method of suspension is merely one example of many ways in which the receptacle could be mounted. It is intended that the receptacles 12 be readily movable into and out of engagement with the roller 6, although its normal position is as shown in the drawings, with the lower portion of the cylinder rotating in the bath of molten metal. Behind the roller 6 is a cooler 15, which is preferably of the water-cooled type, although a pipe furnishing a stream of cold air against the back of the roller would be satisfactory. Attached to the receptacle 12 are shields 16 and 17, and attached to the cooler 15 is a shield 18. The shields 16, 17 and 18, together with the receptacle 12 and cooler 15, form a substantially closed casing around that portion of the roller 6 not covered by the glass sheet, thus tending to keep out the dirt and other foreign material that would otherwise accumulate on the surface of the roller. The lower face of the receptacle 12 also acts as a deflector for the hot gases arising from the molten glass 2, causing these gases to pass horizontally into the drawing mechanism and leer, below the glass sheet.

The temperature of the chamber in which this bending mechanism is located is ordinarily much higher than the melting point of the soft metal used to coat the roller, so that the bath 13 in receptacle 12 will remain in a molten condition without using any other heating means, although heaters below the receptacle could obviously be added if necessary. The roller 6 is internally cooled to such a degree that the tinned surface cannot be entirely melted off, although the outer layer may be somewhat melted by the contacting hot glass. The cooler 15 behind the roller also acts to solidify the tinned surface after leaving the glass sheet. While passing through the molten bath 13 the roller will pick up a thin film of molten tin, unless already carrying a complete layer of this material, the object of the molten bath 13 being to maintain and replenish an even film of semi-molten tin on the surface of the roller. This tin will not ordinarily accumulate to an undesirable extent on the roller surface, but if temperature conditions should necessitate such action the receptacle can be lowered away, out of contact with the roller whenever desired.

The roller 6 is driven from any suitable driving means, the sprocket connection being indicated at 19. Usually the driving connection will be geared to the sheet drawing apparatus. While the roller may be driven at the same speed as the sheet passing thereover, it is preferable to drive it at a faster speed, to exert a polishing action on the lower surface of the sheet. The tinned surface, whether in a semi-solid or molten condition will not have any marring or scratching effect on the glass sheet, or in any way injure the finely fire polished surface. Quite an appreciable resistance is offered to the roller surface as it passes through the bath of molten metal, this friction between the bath and the roller also functioning to polish and clean the surface of the roller.

It is to be understood that throughout this description and the following claims, wherever tin or a tinned surface is referred to, the terms are intended to comprehend the use of lead or other analogous metals of materials, which are known to act the same or in a similar manner when applied to a treated metallic surface as already described.

Claims:

1. A device for bending continuous sheet glass comprising a cylindrical metallic roller having a tinned outer surface.

2. A device for deflecting a continuous sheet of glass comprising an internally cooled cylindrical roller having a tinned outer surface.

3. In a device for bending continuous sheet glass, a cylindrical metallic roller having a tinned outer surface and means for maintaining a film of liquid tin on the surface of the roller.

4. In a device for bending continuous sheet glass, an internally cooled cylindrical metallic roller having a tinned outer surface, and means for maintaining a film of liquid tin on the outer surface of the roller.

5. A device for bending continuous sheet glass, comprising an internally cooled metallic roller having a tinned outer surface, and a bath of molten tin in which the lower portion of the roller revolves, to renew and maintain the tinned surface.

6. A device for bending continuous sheet glass, comprising an internally cooled metallic roller having a tinned outer surface, and means for rotating the roller.

7. A device for bending continuous sheet glass, comprising an internally cooled metallic roller having a tinned outer surface over which the sheet is drawn, and means for rotating the roller at a peripheral speed greater than that of the glass sheet passing thereover.

8. In a bending device for continuous sheet glass, a rotatable cylinder having a tinned surface over which the sheet is bent from one plane to another, and means by which the roller is rotated at a different surface speed from that of the glass sheet passing thereover.

9. In a bending device for continuous sheet glass, a rotatable metallic cylinder having a continually maintained film of metallic tin on its cylindrical surface over which the glass sheet is drawn from one plane to another, means for internally cooling the cylinder, and means by which the cylinder is rotated at a different surface speed from that of the sheet passing thereover.

10. A device for bending continuous sheet glass, comprising an internally cooled metallic cylindrical roller having a tinned outer surface, a receptacle containing a bath of molten tin in which the lower portion of the cylinder rotates, and means by which the cylinder is rotated at a different surface speed from that of the glass sheet which is drawn over its surface.

11. A device for bending continuous sheet glass, comprising an internally cooled metallic roller having a tinned outer surface, a receptacle containing a bath of molten tin in which the lower portion of the roller rotates, the glass sheet being drawn over the tinned surface of the roller, means for rotating the roller, and means for adjusting the receptacle toward and from the roller surface.

12. A bending device for continuous sheet glass, comprising an internally cooled hard metallic roller, and an outer surface coating of a softer non-scratching metal and means for renewing and maintaining the soft metal surface while the device is in operation.

13. A device for bending continuous sheet glass, comprising an internally cooled metallic roller, having a surface coating of soft readily fusible metal over which the sheet is drawn, means for cooling the fused surface after it passes out of engagement with the sheet, and means for renewing and polishing the cooled surface before it again engages the sheet.

14. A bending device for continuous sheet glass, comprising a roller over which the sheet is bent, and means for maintaining a layer of non-scratching material between the roller and the sheet, and simultaneously shielding substantially the entire cylindrical surface of the roller not in contact with the glass sheet.

15. In a bending device for continuous sheet glass, a roller over which the sheet is bent, and means for shielding and protecting substantially the entire portion of the cylindrical surface of the roller not in contact with the glass sheet.

16. In a bending device for continuous sheet glass, a cylindrical roller over which the sheet is bent from a vertical to a horizontal plane, and an adjustable shield substantially enclosing the entire cylindrical portion of the roller not enclosed by the glass sheet.

17. A device for bending continuous sheet glass, comprising an internally cooled metallic roller having a surface coating of soft readily fusible metal over which the sheet is drawn and bent from one plane to another, means for rotating the roller, and means enclosing and protecting substantially the entire portion of the roller surface not in engagement with the sheet, said enclosing means cooling, polishing and renewing the soft metal surface before it reengages with the sheet.

18. In a bending device for continuous sheet glass, a metallic bending roller over which the sheet is bent, and a bath of molten metal in which the lower portion of the roller rotates, to continually polish the surface of the roller.

Signed at Toledo, in the county of Lucas and State of Ohio, this 13th day of December, 1920.

JOSEPH P. CROWLEY.
CLIFFORD A. ROWLEY.